United States Patent [19]
Weseman

[11] Patent Number: 6,053,691
[45] Date of Patent: Apr. 25, 2000

[54] AUTOMATIC UNDERRIDE PROTECTION FOR TILT TRAILERS

[75] Inventor: Brian H. Weseman, Grove City, Minn.

[73] Assignee: Towmaster, Inc., Litchfield, Minn.

[21] Appl. No.: 09/014,015

[22] Filed: Jan. 27, 1998

Related U.S. Application Data

[60] Provisional application No. 60/069,330, Dec. 11, 1997.

[51] Int. Cl.$^7$ ...................................................... B60P 1/00
[52] U.S. Cl. ........................... 414/480; 414/484; 414/485
[58] Field of Search .................................. 414/477–480, 414/482–485, 537, 538

[56] References Cited

U.S. PATENT DOCUMENTS

| | | | |
|---|---|---|---|
| 2,452,681 | 11/1948 | Rehberger | 414/484 |
| 2,919,825 | 1/1960 | Hornsby | 414/483 X |
| 3,066,816 | 12/1962 | Schwartz | 414/480 |
| 3,550,801 | 12/1970 | Larson et al. | 414/537 X |
| 4,305,694 | 12/1981 | Chan | 414/482 |
| 4,516,902 | 5/1985 | Matson | 414/480 |
| 5,022,703 | 6/1991 | Westbrook | 414/480 X |
| 5,195,764 | 3/1993 | Schantz et al. | 414/483 X |
| 5,215,426 | 6/1993 | Bills, Jr. | 414/537 |
| 5,667,231 | 9/1997 | Dierks et al. | 414/483 X |

*Primary Examiner*—Douglas Hess
*Attorney, Agent, or Firm*—Patterson & Keough, P.A.

[57] ABSTRACT

An automatic underride protection actuator for a trailer, where the trailer has a forward end and an opposed rearward end and has a tiltable bed supported by a trailer frame, the tiltable bed being tiltable with respect to the trailer frame between a transport disposition and a load/unload disposition, the tiltable bed presenting a trailer rear margin, a rotatable ramp being operably coupled to the tiltable bed proximate the trailer rear margin, the automatic underride protection actuator including an actuation apparatus. The actuation apparatus is operably coupled to the trailer frame and to the rotatable ramp, the actuation apparatus acting to rotate the rotatable ramp between a ground engaging load/unload disposition when the tiltable bed is in the load/unload disposition and an underride protection disposition when the tiltable bed is in the transport disposition. The actuation apparatus is actuated by the tilting motion of the tiltable bed as the tiltable bed transitions between the transport disposition and the load/unload disposition. The ramp underride protection disposition is a disposition in which the ramp depends from the tiltable bed.

21 Claims, 6 Drawing Sheets

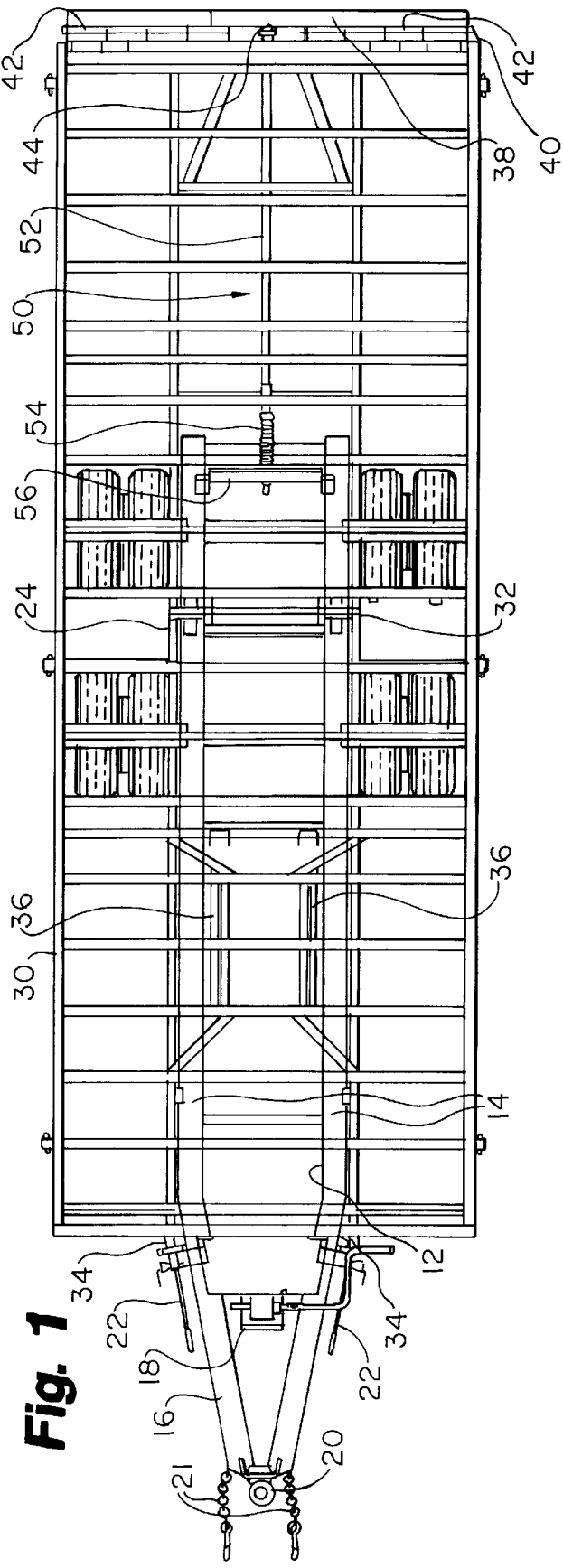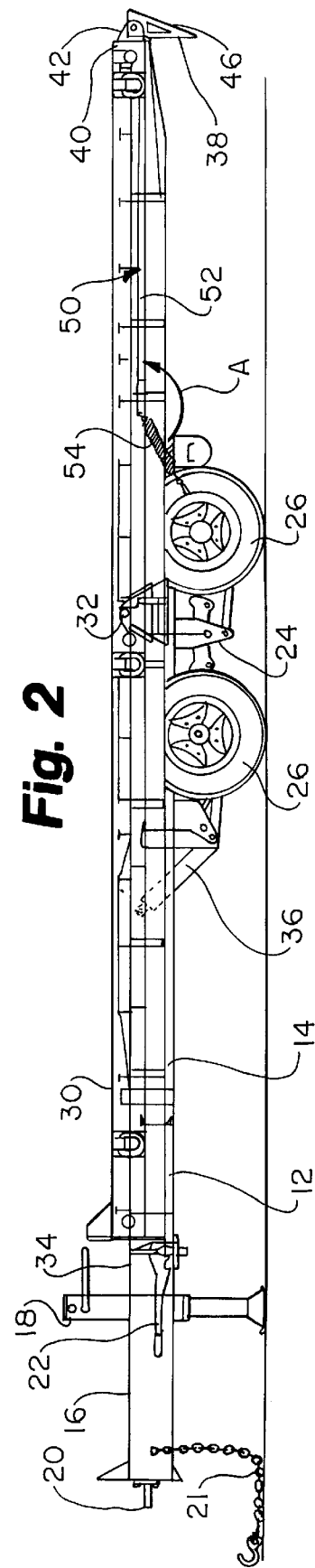

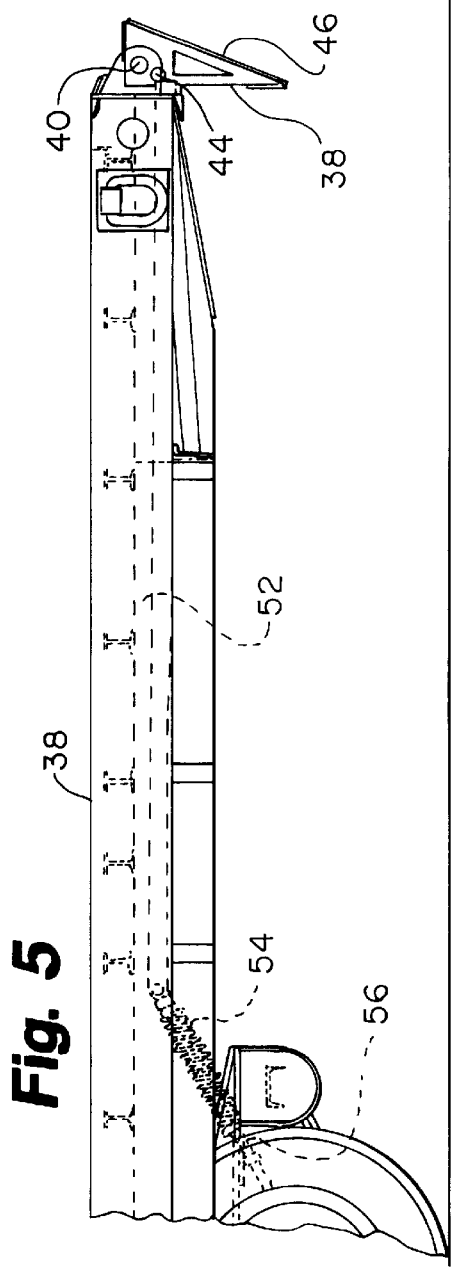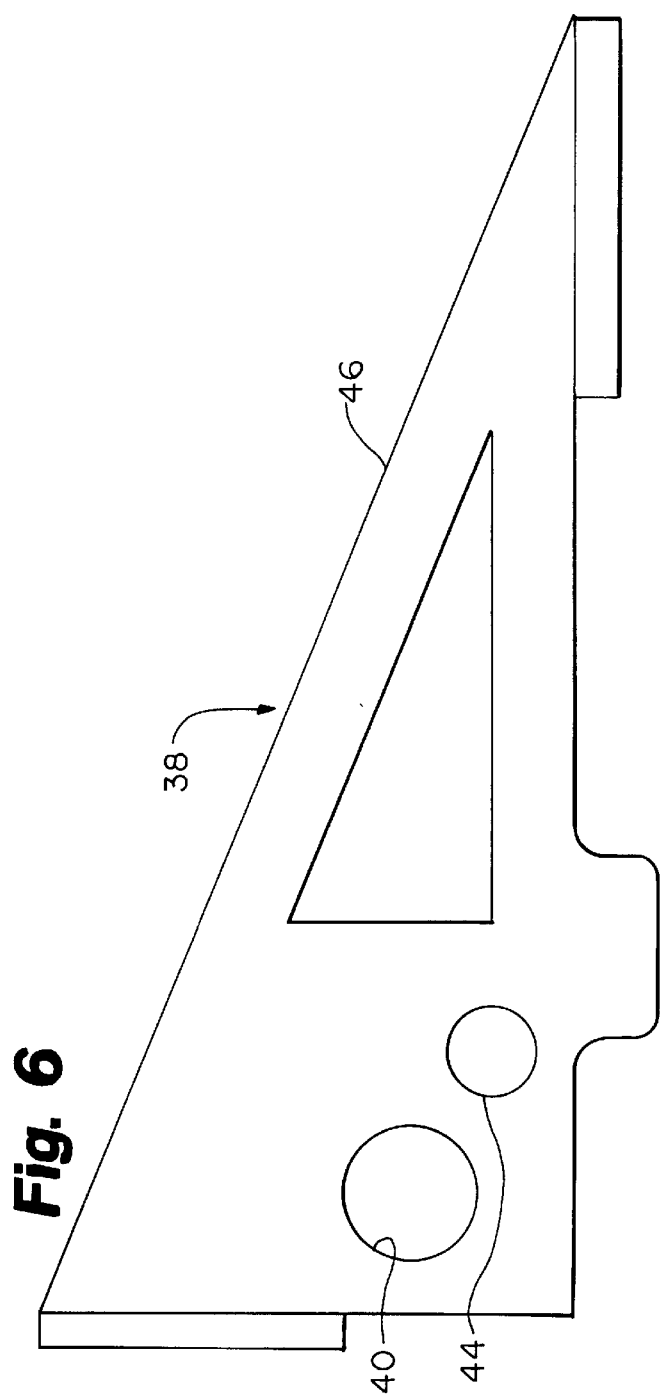

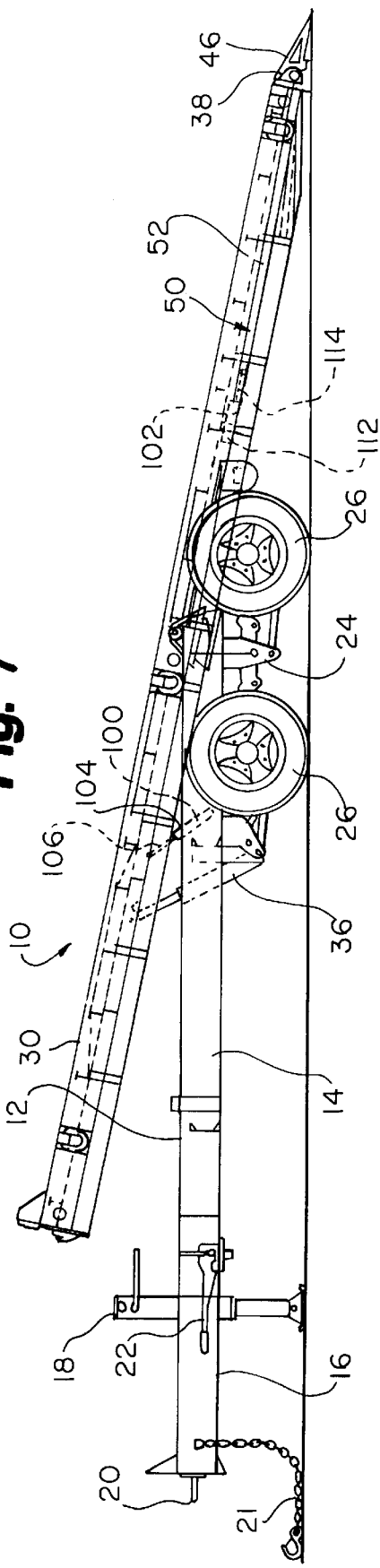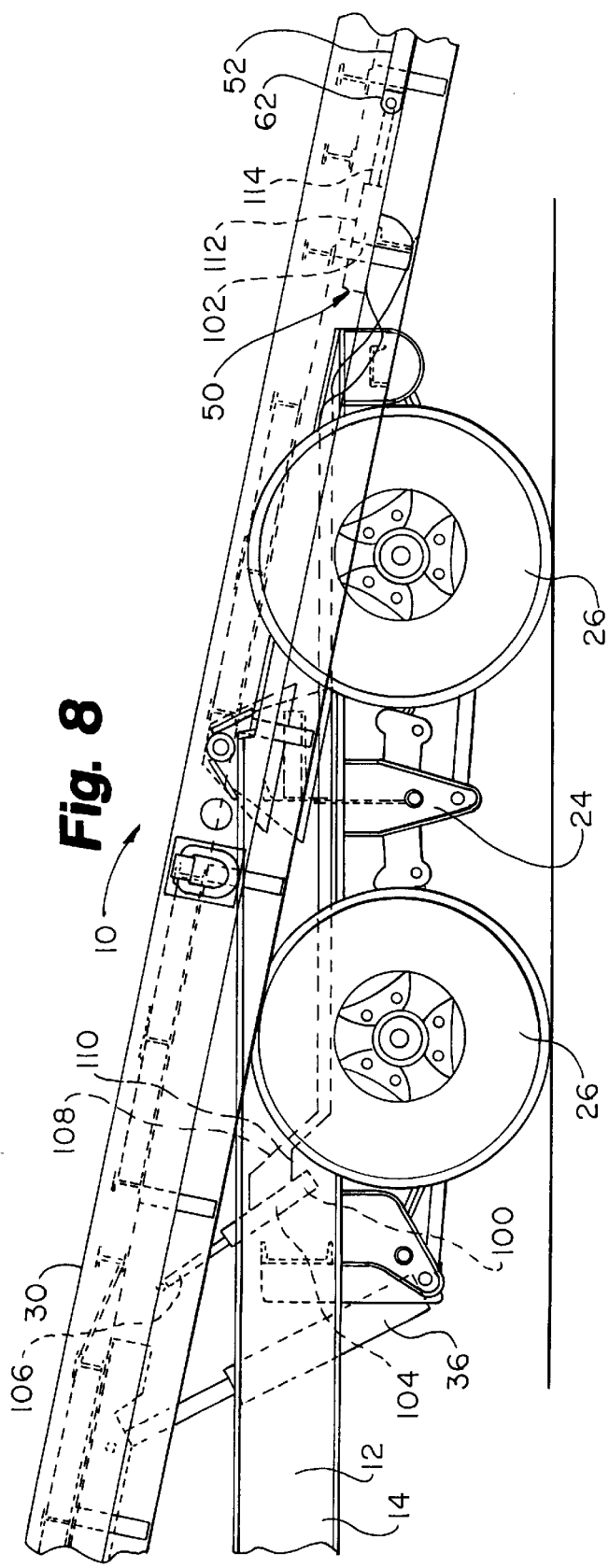

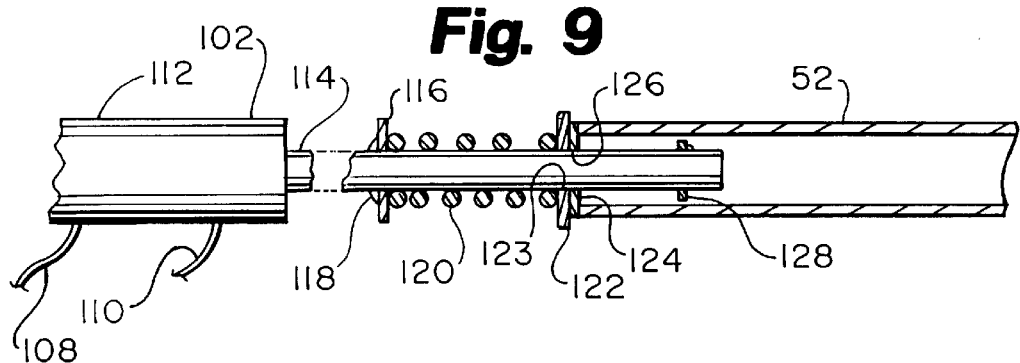
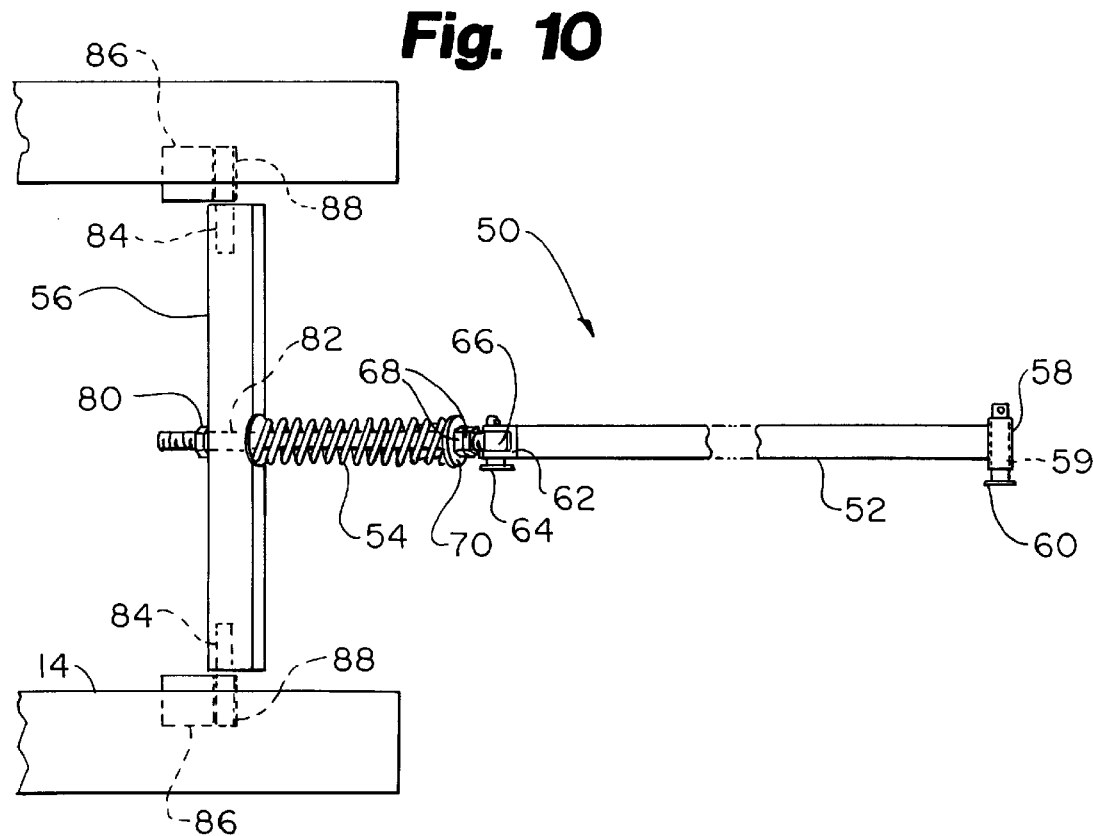
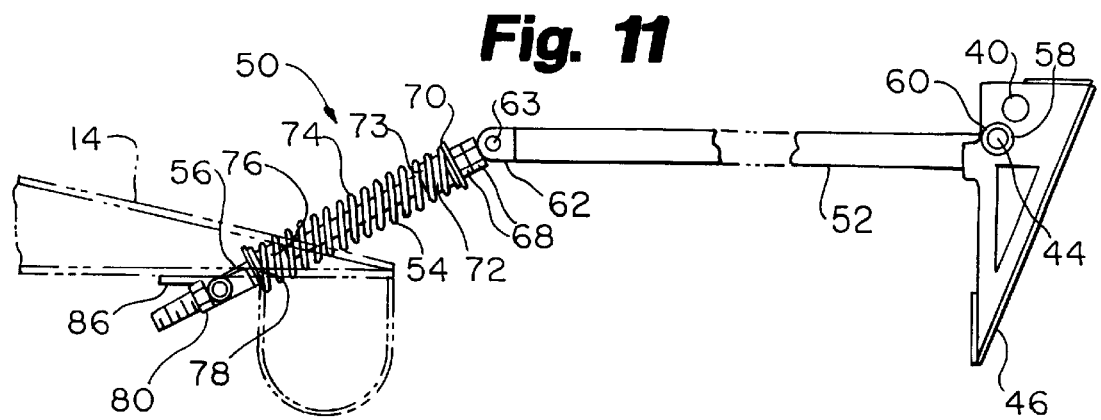

AUTOMATIC UNDERRIDE PROTECTION FOR TILT TRAILERS

RELATED APPLICATIONS

This application claims the benefit of U.S. Provisional Application No. 60/069,330, filed Dec. 11, 1997 and incorporated herein by reference.

TECHNICAL FIELD

The present invention relates to tilt trailers. More particularly, the present invention provides for deployable underride protection for such trailers.

BACKGROUND OF THE INVENTION

Tilt trailers are typically tiltable between a generally level bed, transport disposition for transporting a vehicle or other load disposed on the bed and a tilted load/unload disposition in which the bed is tilted with respect to the trailer frame and wherein a wheeled load, such as a vehicle, may be rolled onto or off of the bed. There is a need in the industry for underride protection for tilt trailers when the trailers are in the transport disposition. Such underride protection is needed to prevent a vehicle that collides with the rear of the tilt trailer from underriding the trailer. In such a collision without underride protection, the colliding vehicle may slide under the trailer bed and the rear of the trailer bed may then impact the passenger compartment of the colliding vehicle thereby causing injury to the occupants of the colliding vehicle.

Underride protection in non-tiltable trailers has long been provided, typically by a frame made of angle iron that depends from the rear of the bed of the trailer. Such protection is commonly seen on semi-type trailers. Such underride protection in non-tiltable trailers is typically permanently fixed in place.

A difficulty for tilt trailers is that any underride protection provided in the transport disposition must be withdrawn in some manner in order to provide for the tilting of the trailer bed in the load/unload disposition where the rear of the bed is in close proximity to the ground. A fixed underride protection frame, such as provided on the aforementioned non-tiltable trailers, would prevent such tilting by coming in contact with the ground. Accordingly, it is desirable that any underride protection for tilt trailers be automatically deployed to provide underride protection when the trailer is in the transport disposition and be automatically retracted to permit tilting of the trailer bed as the trailer bed transitions from the transport disposition to the load/unload disposition.

SUMMARY OF THE INVENTION

The present invention substantially meets the aforementioned needs of the industry. The present invention utilizes a ramp that is pivotally coupled to the rear of the trailer bed to depend downward from the rear of the trailer bed when the trailer is in the transport disposition. In such disposition, the ramp functions as the underride protection. The ramp would be contacted by a vehicle colliding with the rear of the tiltable trailer and prevent the colliding vehicle from underriding the trailer. When the trailer is in transition from the transport disposition to the load/unload disposition, the ramp is then automatically rotated and extended outward from the rear of the trailer to function as a ramp in order to provide transitional support for vehicles being loaded onto the trailer bed from the ground or road surface on which the trailer is resting.

The present invention is an automatic underride protection actuator for a trailer, where the trailer has a forward end and an opposed rearward end and has a tiltable bed supported by a trailer frame, the tiltable bed being tiltable with respect to the trailer frame between a transport disposition and a load/unload disposition, the tiltable bed presenting a trailer rear margin, a rotatable ramp being operably coupled to the tiltable bed proximate the trailer rear margin. The automatic underride protection actuator includes an actuation apparatus. The actuation apparatus is operably coupled to the trailer frame and to the rotatable ramp, the actuation apparatus acting to rotate the rotatable ramp between a ground engaging load/unload disposition when the tiltable bed is in the load/unload disposition and an underride protection disposition when the tiltable bed is in the transport disposition. The actuation apparatus is actuated by the tilting motion of the tiltable bed as the tiltable bed transitions between the transport disposition and the load/unload disposition. The ramp underride protection disposition is a disposition in which the ramp depends from the tiltable bed.

DETAILED DESCRIPTION OF THE DRAWINGS

FIG. 1 is top plan view of a tilt trailer with the deck planking removed to reveal the automatic underride mechanism of the present invention in the underride protection disposition;

FIG. 2 is a side elevational view of a tilt trailer with the automatic underride mechanism depicted in phantom in the underride protection disposition, the trailer being in the transport disposition;

FIG. 5 is an enlarged side elevational view of the automatic underride mechanism as depicted in FIG. 2 with portions thereof depicted in phantom;

FIG. 6 is a side elevational side view of the tilt trailer ramp;

FIG. 7 is a side elevational view of a tilt trailer in the load/unload disposition with an alternative embodiment of the automatic underride mechanism of the present invention in the load/unload disposition with portions thereof depicted in phantom;

FIG. 8 is an enlarged side elevational view of the automatic underride mechanism as depicted in FIG. 7 with portions thereof depicted in phantom;

FIG. 9 is an alternative coupling mechanism for use with the embodiment of the automatic underride mechanism as depicted in FIGS. 7 and 8;

FIG. 10 is a top plan view of the automatic underride mechanism of the present invention; and FIG. 11 is a side elevational view of the automatic underride mechanism of the present invention in the transport disposition.

DETAILED DESCRIPTION OF THE DRAWINGS

A tilt trailer is shown generally at 10 in the figures. The tilt trailer 10 has major subcomponents comprising chassis 12 and tilt bed 30.

Figure 3:
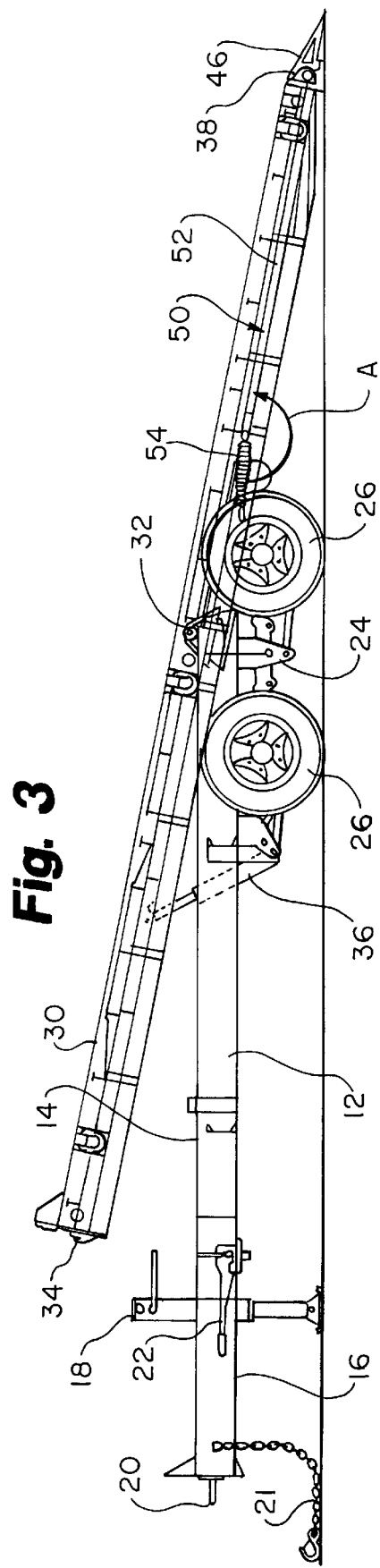
FIG. 3 is a side elevational view of a tilt trailer with the automatic underride mechanism depicted in phantom in the load/unload disposition, the trailer being in the load/unload disposition.
Figure 4:
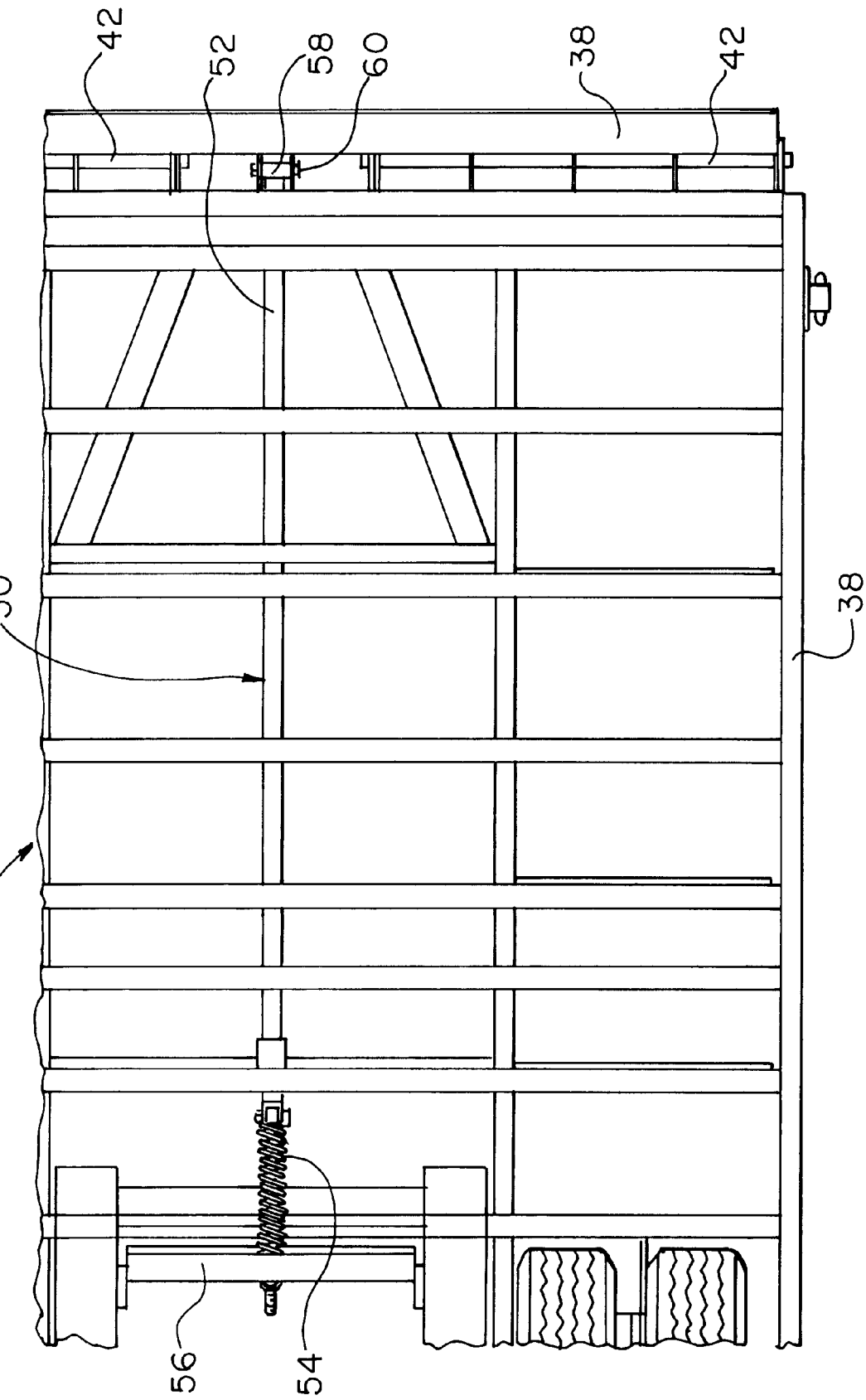
FIG. 4 is a an enlarged top plan view of the automatic underride mechanism as depicted in FIG. 1.

Referring to FIGS. 1, 2 and 3, the chassis 12 of the tilt trailer 10 has a frame 14 that is preferably comprised of welded steel beams. The outer two beams that comprise frame 14 are bent inward at the front of the tilt trailer 10 to comprise the tongue 16.

The tongue 16 has a pair of jacks 18 that may be cranked up and down as desired to support the front portion of the tilt trailer 10. A tow ring 20 and safety chains 21 are provided at the front of the tongue 16 for coupling to a towing vehicle. A rotatable lock down 22 is fixedly coupled to the outwardly directed side portion of each of the frame rails that comprise the tongue 16.

A wheel suspension 24 depends from the underside of the frame 14 and carries a plurality of ground engaging wheels 26. The suspension system 24 may include a braking system that acts on the wheels 26.

The tilt bed 30 is disposed on top of and supported by the frame 14. Tilt bed 30 is coupled to frame 14 by a pivot 32. A pair of lock down catches 34 are positioned at the front of the tilt bed 30. The lock down catches 34 may be engaged by the respective lock downs 22 to releasibly secure the tilt bed 30 to the frame 14 in the transport disposition depicted in FIG. 2. Disengaging the lock downs 22 from their associated lock down catches 34, frees the tilt bed 30 to rotate about the pivot 32 and to transition from the transport disposition depicted in FIG. 2 to the load/unload disposition depicted in FIG. 3.

A relatively large hydraulic piston 36 has a first end coupled to the frame 14 and a second end coupled to the tilt bed 30. The hydraulic piston 36 acts to control the rate at which the tilt bed 30 may be tilted with respect to the frame 14. A pair of hydraulic pistons 36 may be employed in a side-by-side disposition.

A pivotable ramp 38 is disposed at the rear of the tilt bed 30 extending substantially the full width of the tilt bed 30. The ramp 38 has a series of pivot bores 40 defined therein. The pivot bores 40 are in registry. A pair of bar hinges 42, as depicted in FIG. 1, are passed through the pivot bores 40 and through corresponding bores (not shown) defined in the rear portion of the tilt bed 30 to pivotally couple the ramp 38 to the rear portion of the tilt bed 30.

An actuator bar coupler 44 is comprised of a pair of bores that are in registry defined in the ramp 38. The actuator bar coupler 44 is displaced from the pivot bore 40 by a distance that is less than 6 inches and preferably approximately 3½ inches. A load surface 46 is presented on the ramp 38. When the tilt bed 30 is in the load/unload disposition depicted in FIG. 3, the load surface 46 is generally upwardly directed in order to receive vehicles being loaded onto the tilt bed 30. The load surface 46 is presented in a generally rearward direction when the ramp 38 is in the downward depending ramp underride protection disposition depicted in FIGS. 1 and 2. It is the load surface 46 of the ramp 38 that bears the impact of a rear colliding vehicle and prevents the colliding vehicle from underriding the tilt bed 30.

The automatic underride mechanism (AUM) of the present invention is shown generally at 50 in the figures. In a first preferred embodiment of the present invention depicted in FIGS. 1–6, 10, and 11 the AUM 50 is a multi-link system coupled to the ramp 38 and having three subcomponents: actuator bar 52, tension bar 54, and cross bar 56, each of which comprises a link of the multi-link system that is coupled to the ramp 38.

Referring to FIGS. 10 and 11, the first link is the actuator bar 52 of the AUM 50. The actuator bar 52 is preferably comprised of inch and one-half schedule 80 steel pipe. A lateral bushing 58 is welded to a first end of the actuator bar 52. The bushing 58 has a bore 59 defined longitudinally therethrough. In order to couple the actuator bar 52 to the ramp 38, the lateral bushing 58 is positioned between two actuator bar couplers 44 of the ramp 38. A pin 60 is then disposed in the bore 59 and through the actuator bar couplers 44, thereby pivotally coupling the actuator bar 52 to the ramp 38.

A clevis 62 is disposed at the second end of the actuator bar 52. A pair of bores 63 are defined in the clevis 62. A clevis pin 64 is passed through the bores 63 and through a bore (not shown) defined in the connector 66 to pivotally couple the actuator bar 52 to the tension bar 54.

The connector 66 is fixedly coupled to an end of the tension bar 54. The tension bar 54 is the second link of the multi-link system and is preferably comprised of a one-inch diameter threaded steel rod. A pair of lock nuts 68 are threadedly disposed on the tension bar 54 proximate the connector 66. A large washer 70 engages the innermost lock nut 68.

A spring retainer 72 is positioned flush with the washer 70. The spring retainer 76 has an inwardly directed sleeve 73. The sleeve 73 is slid into the inner diameter of the spring 74, thereby positioning the spring 74 on the tension bar 54. Spring 74 is preferably an elongate coil spring.

A second spring retainer 76 is disposed on the tension bar 54 and engages the second end of the spring 74. The spring retainer 76 abuts a floating washing 78 that is also positioned on the tension bar 54. The second end of the tension bar 54 passes through a bore 82 defined in a cross bar 56. An adjusting nut 82 is threadedly engaged with the tension bar 54. The tension in the spring 74 is adjustable by the selected position of the adjusting nut 80 with respect to the threaded tension bar 54.

The cross bar 56 is the third link of the multi-link system and is preferably formed of a box section steel tube. As previously indicated, a bore 82 is defined therethrough for receiving the tension bar 54 therein. In such disposition, the adjusting nut 80 abuts one side of the cross bar 56 and the floating washer 78 is held in compression against the opposed side of the cross bar 56 by the bias exerted by the spring 74.

An outwardly directed pin 84 is welded at both ends of the cross bar 56. Each of the pins 84 is rotatably received within a pin bore 88 defined in a pin receiver 86. The pin receivers 86 are preferably welded to a rail of the frame 14.

In operation, the two lock downs 22 are disengaged from the respective lock down catches 34, thereby freeing the tilt bed 30 to tilt with respect to the chassis 12. With an unloaded tilt trailer 10, a person standing on the deck of the tilt bed 30 forward of the pivot 32 moves rearward to a position on the tilt bed 30 that is rearward of the pivot 32. The weight of the operator rearward of the pivot 32 causes the tilt bed 30 to start tilting from the transport disposition depicted in FIG. 2 to the load/unload disposition depicted in FIG. 3. The action of the hydraulic piston 36 acts as a restraint on the tilting motion of the tilt bed 30 causing the tilt bed 30 to move relatively slowly toward the load/unload disposition. The tilting motion of the tilt bed 30 results in an increased included angle A defined between the actuator bar 52 and the tension bar 54. The angle A is depicted in FIGS. 2 and 3 and is increased in FIG. 3 as compared with FIG. 2. The angle A ranges from approximately 125 degrees in FIG. 2 to substantially 180 degrees in FIG. 3. The spring 74 acts on the actuator bar 52 to shift the actuator bar 52 rearward, thereby rotating the pivotable ramp 38 in an arc of approximately 90 degrees about the pivot bore 40.

In order to cause the tilt bed 30 to transition from the load/unload disposition to the transport disposition, the actions are essentially the reverse of the aforementioned actions. An operator, standing on the deck of the tilt bed 40 and positioned rearward of the pivot 32 walks forward on the tilt bed 30 to a position forward of the pivot 32. The added weight of the operator forward of the pivot 32 causes the tilt bed 30 to commence transition to the transport disposition. Again, the tilting motion is restrained by the hydraulic piston 36.

The tilting motion of the tilt bed 30 causes the included angle A between the actuator bar 52 and the tension bar 54 to decrease. As the angle A decreases, the actuator bar 52 is retracted, thereby rotating the pivotable ramp 38 about the pivot bore 40 to the underride protection disposition as depicted in FIG. 2. When the tilt bed 30 is again disposed lying on the frame 14 of the chassis 12, the lock downs 22 may be re-engaged with the lock down catches 34 in order to secure the tilt bed 30 to the chassis 12. As described, the ramp 38 is automatically retracted to the underride protection disposition when the tilt bed 30 transitions to the transport disposition so that at all times that the tilt bed 30 is in the transport disposition, the ramp 38 is depending therefrom, without operator intervention, in position to prevent the underriding motion of an impacting vehicle.

An alternative embodiment of the present invention is depicted in FIGS. 7–9. The AUM 50 depicted in FIGS. 7–9 substitutes hydraulic actuation for the tension bar 54 of the aforementioned embodiment. The embodiment of the AUM 50 retains the actuator bar 52. The hydraulic actuation of the AUM 50 is provided by a master hydraulic cylinder 100 and slave hydraulic cylinder 102.

The master hydraulic cylinder has a cylinder body 104. The cylinder body 104 is fixedly coupled to the frame 14 of the chassis 12. A translatable piston 106 is positioned within the cylinder body 104. The distal end of the piston 106 is fixedly coupled to the tilt bed 30. A pair of hydraulic lines 108, 110, depicted in FIG. 8, fluidly couple the master hydraulic cylinder 100 and the slave hydraulic cylinder 102.

The slave hydraulic cylinder 102 has a cylinder body 112. The cylinder body 112 is fixedly coupled to the tilt bed 30. A piston 114 is translatably disposed within the cylinder body 112. The piston 114 is coupled to the clevis 62 of the actuator bar 52.

Referring to FIG. 9, an alternative embodiment of the coupling between the slave hydraulic cylinder 102 and the actuator bar 52 is provided. This method of coupling provides some compliance in the overall combined length of the slave hydraulic cylinder 102 and the actuator bar 52 and utilizes the bias of a spring to assist in extension of the actuator bar 52 when the tilt trailer 10 is transitioned into the load/unload disposition.

In the embodiment of FIG. 9, a fixed washer 116 is affixed to the piston 114 preferably by weldments 118. A coil spring 120 that is concentric with the piston 114 is slid over the piston 114. The coil spring 120 is held in compression between fixed washer 116 and floating washer 122. It should be noted that the piston 114 is free to translate in either direction through the bore 123 defined in the floating washer 122.

The floating washer 122 abuts an end cap 124 disposed on the end of the actuator bar 52. The end cap 124 has a cap aperture 126 defined therein and the piston 114 is free to translate in either direction through the cap aperture 126.

In operation, tilting of the tilt bed 30 is accomplished as previously described. As the tilt bed 30 begins to translate from the transport disposition to the load/unload disposition, the piston 106 of the master hydraulic cylinder 100 is extended. This extension causes the master hydraulic cylinder 100 to act as a pump pumping hydraulic fluid through hydraulic line 108 to the slave hydraulic cylinder 102. The hydraulic fluid forced into the cylinder body 112 of the slave hydraulic cylinder 102 causes the piston 114 to extend. Such extension forces the actuator bar 52 to translate rearward, rotating the pivotable ramp 38 into the load/unload disposition. With a coupling as depicted in FIG. 9, extension of the piston 114 increases the compression of the spring 120. The spring 120 then exerts a bias on the actuator bar 52, causing the actuator bar 52 to translate rearward.

When the tilt bed 30 is tilted from the load/unload disposition to the transport disposition the master hydraulic cylinder 100 again acts as a pump. Retraction of the piston 106 into the cylinder body 104 forces hydraulic fluid through hydraulic line 110 to the cylinder body 112 of the slave hydraulic cylinder 102. The hydraulic fluid under pressure acts on the piston 114 to retract the piston 114 and the actuator bar 52. The retraction of the actuator bar 52 rotates the pivotable ramp 38 downward through an arc of 90° into the underride protection disposition of the pivotable ramp 38 as depicted in FIG. 2.

With the connection as embodied in FIG. 9, the piston 114 is retracted, the piston 114 will translate with respect to the actuator bar 52 until the fixed washer 128 engages the end cap 124. At this point, the actuator bar 52 is caused to translate and retract, thereby pivoting the pivotable ramp 38 into the underride protection disposition.

The present invention may be embodied in other specific forms without departing from the spirit of the essential attributes thereof. Therefore, the illustrated embodiment should be considered in all respects as illustrative and not restrictive, reference being made to the appended claims rather than to the foregoing description to indicate the scope of the invention.

What is claimed is:

1. Automatic underride mechanism for a trailer, the trailer having a forward end and an opposed rearward end and having a tiltable bed supported by a trailer frame, the tiltable bed being tiltable with respect to the trailer frame between a transport disposition and a load/unload disposition, the tiltable bed presenting a trailer rear margin, a rotatable ramp being operably coupled to the tiltable bed proximate the trailer rear margin, the automatic underride mechanism comprising:

actuation means operably coupled to the trailer frame and to the rotatable ramp, the actuation means acting to rotate the rotatable ramp between a ground engaging load/unload disposition when the tiltable bed is in the load/unload disposition and an underride protection disposition when the tiltable bed is in the transport disposition, the actuation means being actuated by the tilting motion of the tiltable bed as the tiltable bed transitions between the transport disposition and the load/unload disposition, the ramp underride protection disposition being a disposition in which the ramp depends from the tiltable bed;

the actuation means including at least a first and a second link, the first and second links being pivotally operably coupled; and a bias being exerted on at least one of the first and the second link, the bias tending to urge one of said links in a rearward direction, the bias being exerted by a coil spring disposed coaxially with the second link, urging the first link in a rearward direction.

2. The automatic underride mechanism of claim 1 wherein an included angle is defined between the first and second links that is between 120 degrees and 180 degrees.

3. The automatic underride mechanism of claim 1 wherein a force exerted by said bias is selectable.

4. The automatic underride mechanism of claim 1 wherein said bias acts to cushion an impact on the ramp when the ramp is in the ramp underride protection disposition.

5. The automatic underride mechanism of claim 1 wherein the actuation means acts to rotate the rotatable ramp through an arc of substantially ninety degrees between the a ground engaging load/unload disposition and the underride protection disposition.

6. The automatic underride mechanism of claim 1 wherein the actuation means includes a third link, the third link being disposed substantially transverse to the second link and operably coupled thereto.

7. The automatic underride mechanism of claim 6 wherein the third link is pivotally operably coupled to the trailer frame.

8. Automatic underride mechanism for a trailer, the trailer having a forward end and an opposed rearward end and having a tiltable bed supported by a trailer frame, the tiltable bed being tiltable with respect to the trailer frame between a transport disposition and a load/unload disposition, the tiltable bed presenting a trailer rear margin, a rotatable ramp being operably coupled to the tiltable bed proximate the trailer rear margin, the automatic underride mechanism comprising:

actuation means operably coupled to the trailer frame and to the rotatable ramp, the actuation means acting to rotate the rotatable ramp between a ground engaging load/unload disposition when the tiltable bed is in the load/unload disposition and an underride protection disposition when the tiltable bed is in the transport disposition, the actuation means being actuated by the tilting motion of the tiltable bed as the tiltable bed transitions between the transport disposition and the load/unload disposition, the ramp underride protection disposition being a disposition in which the ramp depends from the tiltable bed;

wherein the actuation means includes at least a first and second link, the first and second links being pivotally operably coupled; and further wherein the actuation means includes a third link, the third link being substantially transverse to the second link and slidably operably coupled thereto, a portion of the second link being slidably disposed in a bore defined in the third link.

9. An automatic underride protector for a trailer, the trailer having a tiltable bed supported by a trailer frame, the tiltable bed being tiltable with respect to the trailer frame between a transport disposition and a load/unload disposition, the tiltable bed presenting a trailer rear margin, the automatic underride protector comprising:

a rotatable ramp being operably coupled to the tiltable bed proximate the trailer rear margin;

actuation means operably coupled to the trailer frame and to the rotatable ramp, the actuation means acting to rotate the rotatable ramp between a ground engaging load/unload disposition when the tiltable bed is in the load/unload disposition and an underride protection disposition when the tiltable bed is in the transport disposition, the actuation means being actuated by the tilting motion of the tiltable bed as the tiltable bed transitions between the transport disposition and the load/unload disposition, the ramp underride protection disposition being a disposition in which the ramp depends from the tiltable bed;

the actuation means including at least a first and a second link, the first and second links being pivotally operably coupled; and a bias being exerted on at least one of the first and a second links, the bias tending to urge one of said links in a rearward direction, and wherein the bias is exerted by a coil spring disposed coaxial with the second link, urging the first link in a rearward direction.

10. The protector of claim 9 wherein an included angle is defined between the first and second links that is between 120 degrees and 180 degrees.

11. The protector of claim 9 wherein a force exerted by said bias is selectable.

12. The protector of claim 9 wherein said bias acts to cushion an impact on the ramp is in the ramp underride protection disposition.

13. The protector of claim 9 wherein the rotatable ramp is operably coupled at a first pivot axis to the tiltable bed and at a second pivot axis to the first link, the first pivot axis being displaced with respect to the second pivot axis.

14. The protector of claim 9 wherein the first pivot axis is displaced less than six inches with respect to the second pivot axis.

15. The protector of claim 14 wherein the first pivot axis is displaced less than three inches with respect to the second pivot axis.

16. The protector of claim 9 wherein the actuation means acts to rotate the rotatable ramp through an arc of substantially ninety degrees between the a ground engaging load/unload disposition and the underrride protection disposition.

17. The protector of claim 9 wherein the actuation means includes a third link, the third link being disposed substantially transverse to the second link and operably coupled thereto.

18. The protector of claim 17 wherein the third link is pivotally operably coupled to the trailer frame.

19. The protector of claim 17 wherein the third link is slidably operably coupled to the second link, a portion of the second link being slidably disposed in a bore defined in the third link.

20. An automatic underride protector for a trailer, the trailer having a tiltable bed supported by a trailer frame, the tiltable bed being tiltable with respect to the trailer frame between a transport disposition and a load/unload disposition, the tiltable bed presenting a trailer rear margin, the automatic underride protector comprising:

a rotatable ramp being operably coupled to the tiltable bed proximate the trailer rear margin;

actuation means operably coupled to the trailer frame and to the rotatable ramp, the actuation means acting to rotate the rotatable ramp between a ground engaging load/unload disposition when the tiltable bed is in the load/unload disposition and an underride protection disposition when the tiltable bed is in the transport disposition, the actuation means being actuated by the tilting motion of the tiltable bed as the tiltable bed transitions between the transport disposition and the load/unload disposition, the ramp underride protection disposition being a disposition in which the ramp depends from the tiltable bed;

the actuation means including at least a first and a second link, the first and second links being pivotally operably coupled; and a bias being exerted on at least one of the first and a second links, the bias tending to urge one of said links in a rearward direction; and the actuation means including a third link, the third link being disposed substantially transverse to the second link and operably coupled thereto, the third link being slidably operably coupled to the second link, a portion of the second link being slidably disposed in a bore defined in the third link.

21. An automatic underride protector for a trailer, the trailer having a tiltable bed supported by a trailer frame, the tiltable bed being tiltable with respect to the trailer frame between a transport disposition and a load/unload disposition, the tiltable bed presenting a trailer rear margin, the automatic underride protector comprising:

a rotatable ramp being operably coupled to the tiltable bed proximate the trailer rear margin;

actuation means operably coupled to the trailer frame and to the rotatable ramp, the actuation means acting to rotate the rotatable ramp between a ground engaging load/unload disposition when the tiltable bed is in the load/unload disposition and an underride protection disposition when the tiltable bed is in the transport disposition, the actuation means being actuated by the tilting motion of the tiltable bed as the tiltable bed transitions between the transport disposition and the load/unload disposition, the ramp underride protection disposition being a disposition in which the ramp depends from the tiltable bed;

the actuation means including at least a first and a second link, the first and second links being pivotally operably coupled, the actuation means further including a third link, the third link being disposed substantially transverse to the second link and operably coupled thereto, the third link being slidably operably coupled to the second link, a portion of the second link being slidably disposed in a bore defined in the third link; and a bias being exerted on at least one of the first and second links, the bias tending to urge one of said links in a rearward direction.

* * * * *